United States Patent
Louw

(10) Patent No.: US 11,394,470 B2
(45) Date of Patent: Jul. 19, 2022

(54) COMMUNICATION METHOD

(71) Applicant: DETNET SOUTH AFRICA (PTY) LTD, Johannesburg (ZA)

(72) Inventor: Gerhard Brink Louw, Pretoria (ZA)

(73) Assignee: DETNET SOUTH AFRICA (PTY) LTD, Johannesburg (ZA)

( * ) Notice: Subject to any disclaimer, the term of this patent is extended or adjusted under 35 U.S.C. 154(b) by 0 days.

(21) Appl. No.: 17/055,053

(22) PCT Filed: Mar. 26, 2019

(86) PCT No.: PCT/ZA2019/050013
§ 371 (c)(1),
(2) Date: Nov. 12, 2020

(87) PCT Pub. No.: WO2019/222772
PCT Pub. Date: Nov. 21, 2019

(65) Prior Publication Data
US 2021/0218479 A1    Jul. 15, 2021

(30) Foreign Application Priority Data

May 17, 2018  (ZA) .................................. 2018/03286

(51) Int. Cl.
 *H04B 13/02*    (2006.01)
 *E21B 47/125*   (2012.01)
 *F42D 1/05*     (2006.01)

(52) U.S. Cl.
 CPC .......... *H04B 13/02* (2013.01); *E21B 47/125* (2020.05); *F42D 1/05* (2013.01)

(58) Field of Classification Search
 CPC .......... H04B 13/02; E21B 47/125; F42D 1/05

USPC ........................................................ 375/218
 See application file for complete search history.

(56) References Cited

U.S. PATENT DOCUMENTS

| | | | |
|---|---|---|---|
| 2005/0219543 A1* | 10/2005 | Uehara ................... | G01J 11/00 356/450 |
| 2014/0111703 A1* | 4/2014 | Luff ....................... | H04N 5/7416 348/759 |
| 2017/0034507 A1* | 2/2017 | Harris .................... | H04N 17/00 |
| 2017/0350238 A1 | 12/2017 | Werkheiser et al. | |

OTHER PUBLICATIONS

Dantas, S., "Simulation of IEEE 1902.1 (RuBee) Protocol for Communication with Buried Assets," 2017 IEEE 28th Annual International Symposium on Personal, Indoor and Mobile Radio Communications (PIMRC), IEEE, Oct. 8, 2017, XP033321466, 6 pages.
International Preliminary Report on Patentability for PCT/ZA2019/050013, international filing date of Mar. 26, 2019, dated May 4, 2020, 12 pages.
International Search Report for PCT/ZA2019/050013, international filing date of Mar. 26, 2019, dated Jul. 2, 2019, 4 pages.
Written Opinion for PCT/ZA2019/050013, international filing date of Mar. 26, 2019, dated Jul. 2, 2019, 6 pages.

* cited by examiner

*Primary Examiner* — Ted M Wang
(74) *Attorney, Agent, or Firm* — Cantor Colburn LLP

(57) ABSTRACT

A method of communicating through the earth which includes the steps of using a digital pulse train to generate a sweep pulse train which controls the frequency of a magnetic field at a first location, and at a second location, detecting the magnetic field and producing a signal at a frequency dependent on the frequency of the sweep pulse train, and extracting a replica of the digital pulse train from the signal.

6 Claims, 2 Drawing Sheets

COMMUNICATION METHOD

CROSS-REFERENCE TO RELATED APPLICATIONS

This application is a U.S. national stage application of International Application No. PCT/ZA2019/050013 entitled "METHOD OF COMMUNICATING THROUGH THE EARTH USING A MAGNETIC FIELD", which has an international filing date of 26 Mar. 2019, and which claims priority to South African Patent Application No. 2018/03286, filed 17 May 2018.

BACKGROUND OF THE INVENTION

This invention relates to a method of transmitting a communication signal through the earth. The invention is described hereinafter with reference to its application in a detonator system but this is exemplary only and non-limiting.

In an electronic detonator system a plurality of electronic detonators are placed in respective boreholes drilled into the earth. The detonators can be interconnected by means of wires to a blasting machine and in this way the blasting machine can exercise control over the firing of the detonators. In an alternative technique no conductors are used to connect the detonators to the blasting machine. Instead, wireless communication links are established. This has particular advantages. However, a practical problem arises in ensuring that the communication link from the blasting machine to each detonator is reliable. Of equal importance is the imposition of a timing protocol which ensures that detonators are fired at predetermined intervals with minimal error.

In a detonator system an acceptable communication distance through the earth is of the order of 200 meters. If a high frequency electromagnetic or radio communication system is used, typically operating at a frequency in excess of 100 kHz, signal attenuation due to variable factors such as moisture content, salt content and the like makes the outcome of the process unreliable.

US 2017/0350238 A1 discloses a method for encoding and transmitting digital signals in a downhole environment using frequency sweeps. The frequency sweeps are used to alleviate the need for reliable carrier frequency detection.

An alternative approach is to make use of a technique in which an electrical signal is used to generate a magnetic field which is propagated at a low frequency, say from 1 kHz to 5 kHz, through the earth.

For example, Dantas Stefano et al: "Simulation of IEEE 1902.1 (RuBee) protocol for communication with buried assets", 2017 IEEE 28th Annual International Symposium on Personal, Indoor and Mobile Radio Communications (PIMRC), IEEE, 8 Oct. 2017, XP033321466 describes the use of magnetic induction to send and receive data.

Typically the magnetic field induces a voltage in a receiver coil at a remote point. This arrangement is akin to the working of a normal transformer with coupling between a transmitting coil and the receiver coil being achieved via the intervening earth. This approach, although useful, suffers from certain drawbacks, namely:

(1) the magnetic field decreases in strength rapidly from the transmitting coil and this limits the range that can be realized by the system;

(2) the range can be increased if the data rate is lowered but this is of limited benefit as accurate timing of the order of 1 millisecond is required in a blasting system; and (3) the frequency band of operation, typically 1 kHz to 5 kHz, contains mains power harmonic frequency components, at intervals of 50 Hz or 60 Hz (depending on the prevailing electrical standard), producing interference. These harmonic components continuously shift as the instantaneous mains frequency shifts and effective steps cannot therefore be taken to counter such interference.

The aforegoing difficulties cannot satisfactorily be addressed by adopting the use of modulation schemes such as phase shift keying, frequency shift keying or amplitude modulation.

An object of the present invention is to address, at least to some extent, the aforementioned factors.

SUMMARY OF THE INVENTION

The invention provides a method of communicating through the earth which includes the steps of generating a digital pulse train which represents a communication signal and which comprises a succession of 1's and 0's at a first bit rate, generating a sweep pulse train wherein each 1 in the digital pulse train is represented by a first sweep pulse that sweeps in frequency from a first frequency value to a second frequency value and each 0 in the digital pulse train is represented by a second sweep pulse that sweeps in frequency from the second frequency value to the first frequency value, using the sweep pulse train to control the frequency of a magnetic field which is produced at a first location, at a second location, which is remote from the first location, detecting the magnetic field and, in response thereto, producing an incoming signal at a frequency which is dependent on the frequency of the sweep pulse train, subjecting the incoming signal to a convolution correlating process to produce a secondary signal, and extracting from the secondary signal at least a replica of the digital pulse train.

Preferably, a clock pulse train which is dependent on the first bit rate is recovered from the secondary signal.

In the correlating process use may be made of replicas of the first sweep pulse and replicas of the second sweep pulse. A determination of the likeness of the incoming signal to the replicas is effected at a rate which is substantially higher than the first bit rate. For example if the first bit rate is of the order of 10 bits per second then the correlation may be carried out at a rate of 1200 times per second.

A digital 1 may be represented by a frequency sweep from a low frequency value to a high frequency value, or vice versa. Conversely a digital 0 may be represented by a frequency sweep from a high frequency value to a low frequency value, or vice versa.

The manner in which the frequency changes, during a frequency sweep, may be adapted according to requirement. For example, the frequency sweep may be one in which the frequency changes linearly with time from the first frequency value to the second frequency value. This, however, is not necessarily the case for the frequency may vary from the first value to the second value, with respect to time, on any other appropriate basis.

Information relating to the manner in which the frequency sweep occurs may be stored in an appropriate device for use in the correlating process.

BRIEF DESCRIPTION OF THE DRAWING

The invention is further described by way of example with reference to the accompanying drawing which is a block diagram illustration of a transmitter (FIG. 1) and a receiver (FIG. 2) used in a communication method according to the invention with graphical depictions of pulse trains, generated in the implementation of the method, being shown for explanatory purposes.

DESCRIPTION OF PREFERRED EMBODIMENT

Figure 1:
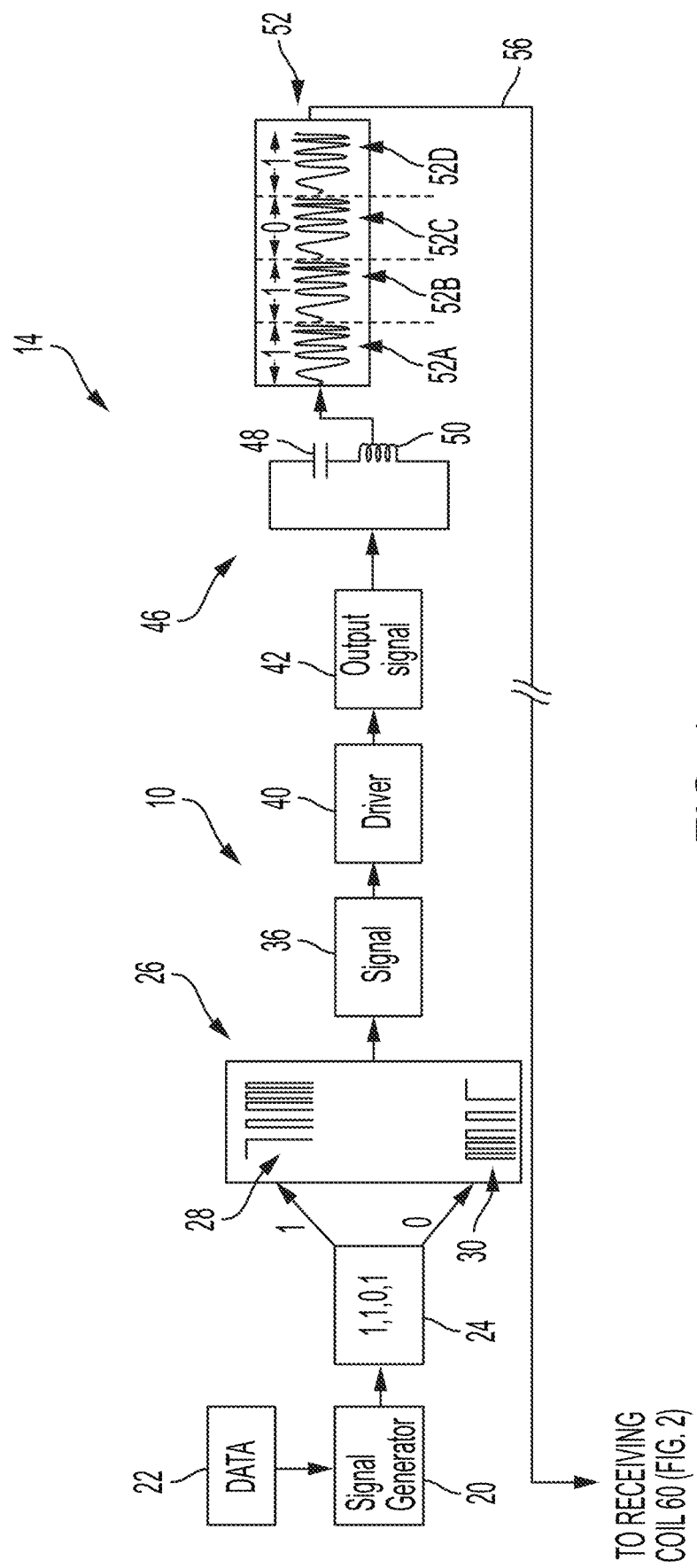
Figure 2:
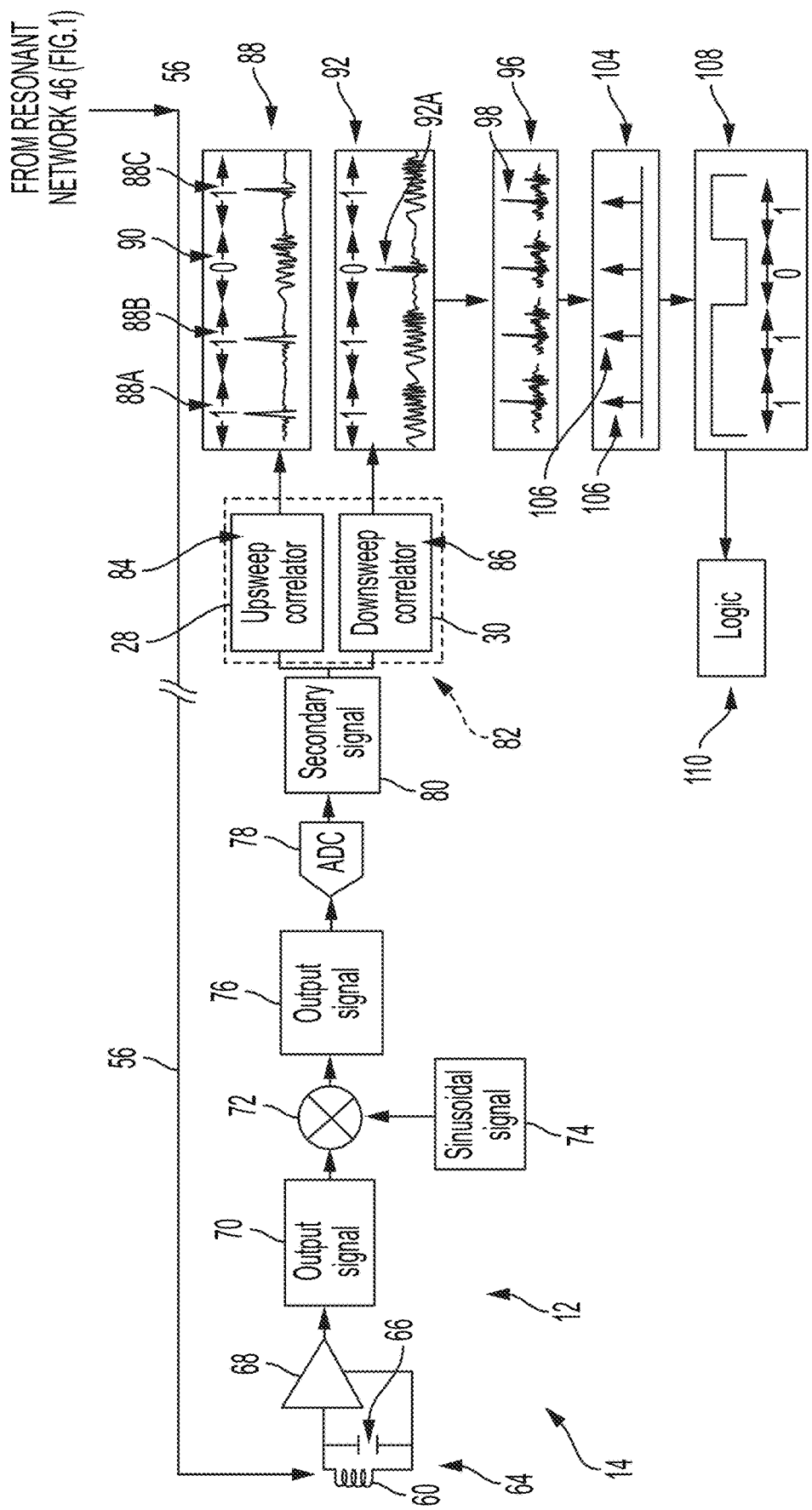

The accompanying drawing comprises FIGS. 1 and 2 which respectively illustrate a transmitter 10, and a receiver 12, each in block diagram form, included in a communication system 14 used to implement the method of the invention.

Referring to FIG. 1 the transmitter 10 includes a signal generator 20 which processes a data containing signal 22 to produce a digital pulse train 24. In this example the digital pulse train 24 represents the data and is shown as a bit train comprising a succession of 1's and 0's, as is known in the art.

In an exciter 26 each 1 is converted into a first sweep pulse 28 that sweeps in frequency from a low frequency to a high frequency for the period of the bit (i.e. the 1). Typically the sweep frequency goes from 3900 Hz to 4100 Hz. The sweep pulse 28 is digital i.e. a succession of 0's and 1's.

Each 0 is converted into a second sweep pulse 30 that sweeps from the high frequency to the low frequency i.e. from 4100 Hz to 3900 Hz, for the period of the bit. The pulse 30 is digital and comprises a succession of 0's and 1's.

An output signal of the exciter 26 thus comprises a sweep pulse train 36 formed with a succession of the first sweep pulses 28 and the second sweep pulses 30 which directly corresponds to the digital pulse train 24. The sweep pulse train 36 is applied to a driver 40 which produces a high voltage, square wave output signal 42 representing the sweep pulse train 36. The signal 42 is fed to a resonant network 46 which includes a tuning capacitor 48 and a transmitting coil 50. The coil 50 translates the alternating electrical input into a magnetic field which sweeps in frequency in a manner which depends on the bits of the digital pulse train 24. The resonant network 46 enhances the efficiency of the system by increasing the voltage on the coil 50 and reduces the harmonic energy which is present in the signal 42 due to the square waves. A signal 52 generated by the resonant network 46 can be seen to include a first sweep pulse 52A, another first sweep pulse 52B, a second sweep pulse 52C and a final first sweep pulse 52D, i.e. the sweep pulses 52A, 52B, 52C and 52D correspond respectively to the (1, 1, 0, 1) bit train in the digital pulse train.

Referring to FIG. 2 the receiver 12 is at a location which is remote from the transmitter 10. An earth path 56, between the resonant network 46 and a receiving coil 60 of the receiver 12, acts as a transformer core. The coil 60 detects the magnetic field and produces an electrical signal which is amplified by a resonant network 64 which comprises the coil 60 in parallel with a capacitor 66. The output signal of the resonant network 64 is fed to a low noise amplifier 68 which produces an amplified output signal 70.

The amplified output signal 70 is mixed, in a mixer 72, with a sinusoidal signal 74 which is at a frequency of 4 kHz i.e. the mean of the maximum sweep frequency value (4100 Hz) and the minimum sweep frequency value (3900 Hz).

An output signal 76 of the mixer 72 is digitized in an analogue to digital converter (ADC) 78 to produce a secondary signal 80. Thereafter signal processing then takes place in a digital manner.

The secondary signal 80 is applied to a convolution correlator 82 which includes an up-sweep correlator 84 containing a replica of a first sweep pulse 28, and a down-sweep correlator 86 which contains a replica of a second sweep pulse 30.

The convolution correlator 82 stores the history of the incoming signal dating back a full bit period. The likeness of this history to a replica of the first sweep pulse 28 (an up-sweep pulse) or to a replica of the second sweep pulse 30 (a down-sweep pulse) is effected at a rate which is higher than the bit rate. In the transmitter 10 the bit rate is of the order of 10 bits per second. The correlation exercise is carried out at a rate of 1200 times per second.

The up-sweep correlator 84 (for the given example) produces an output signal 88 which includes three peaks 88A, 88B and 88C, corresponding respectively to the 1's in the digital pulse train 24, and an intervening section 90 which does not have a peak and which corresponds to the 0 between the second and third 1's. Conversely, the down-sweep correlator 86 produces an output signal 92 with a single peak 92A which corresponds to the 0 in the digital pulse train 24. There are no peaks in those intervals, in the signal 92, which correspond to the peaks 88A, 88B and 88C in the signal 88. By processing the signals 88 and 92 a combined signal 96 is recovered. Each bit interval in the signal 96 contains a peak 98—this indicates that a valid communication signal has been received. The peak in each interval is pronounced and occurs only at the instant at which the history stored correlates precisely with the replica.

A clock signal 104 with clock pulses 106 corresponding to the respective peaks 98 in the signal 96 is then extracted from the combined signal 96.

A data signal 108 is extracted from the signals 88 and 92 and a bit train comprising (1,1,0,1) i.e. corresponding to the digital pulse train 24, is recovered, and applied to a logic unit 110 for further processing.

As the correlation checking is effected at a rate (1200 times per second) which is higher than the bit rate (10 bits per second) the maximums of the correlations occur in each bit period. Thus the data signal 108 is reliably detected.

In the communication technique of the invention the data rate is decreased (in the example to about 10 bits per second) and this carries with it the benefit of an extended signal transmitting range.

If the receiver 12 is associated with a detonator, and equivalent receivers are linked to other detonators in a detonator system, then each detonator receives the equivalent of the clock signal 104 at the same time. This allows the operation of the detonator system to be synchronized with a substantial degree of accuracy which, in this example, is of the order of 2 milliseconds, which is acceptable in most detonator systems—this is achieved despite the relatively low data rate of 10 bps.

A further benefit is that due to the use of the sweep frequencies, the digital to analogue conversion at the transmitter 10, and the analogue to digital conversion at the receiver 12, the problem of interference caused by harmonics of the prevailing mains frequency (50 Hz or 60 Hz as the case may be) is substantially eliminated.

The invention claimed is:

1. A method of communicating through the earth which includes the steps of generating a digital pulse train which represents a communication signal and which comprises a succession of 1's and 0's at a first bit rate, generating a sweep pulse train wherein each 1 in the digital pulse train is represented by a first sweep pulse that sweeps in frequency from a first frequency value to a second frequency value and each 0 in the digital pulse train is represented by a second sweep pulse that sweeps in frequency from the second frequency value to the first frequency value, using the sweep pulse train to control the frequency of a magnetic field which is produced at a first location, at a second location, which is remote from the first location, detecting the magnetic field and, in response thereto, producing an incoming signal at a frequency which is dependent on the frequency of the sweep pulse train, subjecting the incoming signal to a convolution correlating process to produce a secondary signal, and extracting from the secondary signal at least a replica of the digital pulse train.

2. A method of communicating through the earth according to claim 1 wherein a clock pulse train which is dependent on the first bit rate is recovered from the secondary signal.

3. A method of communicating through the earth according to claim 1 wherein correlating process uses replicas of the first sweep pulse and replicas of the second sweep pulse and wherein a determination of the likeness of the incoming signal to the replicas is effected at a rate which is higher than the first bit rate.

4. A method of communicating through the earth according to claim 1 wherein a digital 1 is represented by a frequency sweep from a low frequency value to a high frequency value, and a digital 0 is represented by a frequency sweep from a low frequency value to a high frequency value, or vice versa.

5. A method of communicating through the earth according to claim 1 wherein a digital 0 is represented by a frequency sweep from a low frequency value to a high frequency value, and a digital 1 is represented by a frequency sweep from a high frequency value to a low frequency value, or vice versa.

6. A method of communicating through the earth according to claim 1 wherein stored information, relating to the manner in which the frequency sweep occurs, is used in the correlating process.

\* \* \* \* \*